United States Patent
Kajimoto

(10) Patent No.: US 9,308,781 B2
(45) Date of Patent: Apr. 12, 2016

(54) PNEUMATIC TIRE FOR TWO-WHEELED MOTOR VEHICLE

(75) Inventor: Katsuhiko Kajimoto, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/111,467

(22) PCT Filed: Apr. 9, 2012

(86) PCT No.: PCT/JP2012/059728
§ 371 (c)(1),
(2), (4) Date: Oct. 11, 2013

(87) PCT Pub. No.: WO2012/141149
PCT Pub. Date: Oct. 18, 2012

(65) Prior Publication Data
US 2014/0034201 A1 Feb. 6, 2014

(30) Foreign Application Priority Data
Apr. 15, 2011 (JP) ................................. 2011-091317

(51) Int. Cl.
*B60C 11/03* (2006.01)
*B60C 11/117* (2006.01)
(Continued)

(52) U.S. Cl.
CPC .............. *B60C 11/13* (2013.01); *B60C 9/2204* (2013.04); *B60C 11/032* (2013.04); *B60C 11/0302* (2013.04); *B60C 11/1307* (2013.04);
(Continued)

(58) Field of Classification Search
CPC .............. B60C 11/032; B60C 11/1392; B60C 2200/10

USPC ........................... 152/209.15, 209.18, 209.11
See application file for complete search history.

(56) References Cited

U.S. PATENT DOCUMENTS

| | | | |
|---|---|---|---|
| 5,358,020 A | * | 10/1994 | Haas ........................ 152/209.11 |
| 6,098,681 A | * | 8/2000 | Takahashi et al. ........ 152/209.15 |
| 2007/0251625 A1 | * | 11/2007 | Ikehara ......................... 152/451 |

FOREIGN PATENT DOCUMENTS

| | | | | |
|---|---|---|---|---|
| GB | 1549347 A | * | 8/1979 | .............. B60C 11/04 |
| JP | 07-329514 A | | 12/1995 | |

(Continued)

OTHER PUBLICATIONS

Machine Translation: JP 11208218 A; Terada, Koji; no date.*
(Continued)

*Primary Examiner* — Steven D Maki
*Assistant Examiner* — Kendra Ly
(74) *Attorney, Agent, or Firm* — Sughrue Mion, PLLC

(57) ABSTRACT

In a pneumatic tire for a motorcycle employing a spiral belt, a crack is inhibited from being generated from the end section of a groove formed on the surface of a tread section to improve abrasion resistance.
The pneumatic tire for a motorcycle includes at least a one-layered spiral belt (6) in the perimeter side of a carcass (5) and a groove (14) of which a groove end is located between a central position, between a tire equator (E) and a tread end in the width direction of a tread, and the tread end, on a surface of a tread section (4) in an external side in the radial direction of the tire (1) from the spiral belt (6). In the groove (14), a groove wall which forms the groove end located between the central position, between the tire equator and the tread end in the width direction of the tread, and the tread end, has a chamfered shape in a cross section in the width direction.

10 Claims, 3 Drawing Sheets

(51) Int. Cl.
　　　*B60C 11/13* (2006.01)
　　　*B60C 9/22* (2006.01)
(52) U.S. Cl.
　　　CPC ......... *B60C11/1392* (2013.04); *B60C 11/0318* (2013.04); *B60C 11/1384* (2013.04); *B60C 2011/0339* (2013.04); *B60C 2200/10* (2013.04)

(56) References Cited

FOREIGN PATENT DOCUMENTS

| JP | 07329514 A | * | 12/1995 | ............. B60C 11/04 |
| JP | 08-169211 A | | 7/1996 | |
| JP | 11208218 A | * | 8/1999 | ............. B60C 11/04 |
| JP | 3229373 B2 | * | 11/2001 | ............. B60C 11/04 |
| JP | 2009-051360 A | | 3/2009 | |
| JP | 2009-073213 A | | 4/2009 | |
| JP | 2011046260 A | * | 3/2011 | ............ B60C 11/117 |
| JP | 2011225148 A | * | 11/2011 | ............ B60C 11/117 |

OTHER PUBLICATIONS

Machine Translation: JP 3229373 B2; Daisei K et al.; no date.*
Machine Translation: JP 2011225148 A; Nakano, Keita; no date.*
Machine Translation: JP 2011046260 A; Tanigawa, Toshiharu; no date.*
Machine Translation: JP 07329514 A; Nakagawa, Eiko; no date.*
International Search Report of PCT/JP2012/059728 dated Jul. 17, 2012.

* cited by examiner

PNEUMATIC TIRE FOR TWO-WHEELED MOTOR VEHICLE

TECHNICAL FIELD

The present invention relates to a pneumatic tire for a motorcycle (hereinafter simply referred to as "tire"), of which a groove formed in a tread section is inhibited from being cracked.

BACKGROUND ART

The steering stability of a pneumatic tire for a motorcycle is deteriorated by external expansion of the tread section of the tire in the radial direction of the tire due to centrifugal force. Thus, there is a tire employing a spiral belt prepared by winding a rubber-coated cord in spiral form in the circumferential direction of the tire, which spiral belt is a belt located on the external side of a carcass in the internal side of the radial direction of the tire from the tread section of the tire (Patent Document 1). Since the spiral belt sufficiently exerts the effect of a hoop, the tread section of the tire is inhibited from being expanded by centrifugal force even when the tire rotates at a high speed, and the tire employing the spiral belt thus has high steering stability and high traction performance.

RELATED ART DOCUMENT

Patent Document

Patent Document 1: Japanese Unexamined Patent Application Publication No. 2009-51360

SUMMARY OF THE INVENTION

Problems to be Solved by the Invention

The flexing resistance of the tread section of the above-mentioned tire employing the spiral belt is low in comparison with that of a tire employing a crossed belt prepared by stacking and disposing two or more cord layers that form a certain angle with respect to the circumferential direction of the tire so that the directions of the cords of the cord layers cross each other. Therefore, the flexure of a portion of the external side in the width direction of the tread section from a contact area in the tread section during straight-ahead driving, more specifically, a portion from a ¼ point, which is a midway point between the center in the width direction of a tread periphery and an end, to the end in the tire employing the spiral belt is greater than that in the tire employing the crossed belt, and distortion applied to the portion from the ¼ point to the end is thus increased. Accordingly, a possibility that a crack is generated by distortion applied to the end section of a groove in the tire employing the spiral belt, in which the end section of the groove formed on the surface of the tread section is located in the portion from the ¼ point to the end has been higher than that in the tire employing the crossed belt.

The present invention is intended to advantageously solve the above-described problem and is directed at inhibiting a crack from being generated from the end of a groove formed on the surface of a tread section in a pneumatic tire for a motorcycle, in which a spiral belt is employed.

Means for Solving the Problems

The present inventor found that a crack can be inhibited from being generated in the end section of a groove by making a groove corner, defined by a groove wall surface and a tread surface, have a chamfered shape, in the groove end of the groove in which the end section of the groove is located in a portion from the ¼ point of a tread periphery to an end, research was further pursued based the findings, and the present invention was thus accomplished.

A pneumatic tire for a motorcycle according to the present invention includes: at least a one-layered spiral belt prepared by winding a rubber-coated cord in spiral form in the circumferential direction of the tire in the perimeter side of a carcass in a toroidal shape between a pair of bead sections; and a groove of which a groove end is located between a central position, between a tire equator and a tread end in the width direction of a tread, and the tread end, on a surface of a tread section in an external side in the radial direction of the tire from the spiral belt, wherein, in the groove, a groove wall which forms the groove end located between the central position, between the tire equator and the tread end in the width direction of the tread, and the tread end, has a chamfered shape in a cross section in the width direction.

The pneumatic tire for a motorcycle of the present invention can have a constitution in which the chamfered shape is formed to have a length ranging from 1% to 25% of a tread periphery length in a tread width direction from the groove end of the groove. Further, there can be made: a constitution in which the chamfered shape is a curved chamfered shape and a curvature radius is 0.5 to 5 mm; and a constitution in which the chamfered shape is a planar shape.

As used herein, a periphery length refers to a length in a meridian direction measured along a tread surface during no loading in the state in which a tire is set in a rim specified in JATMA (THE Japan Automobile Tyre Manufacturers Association, Inc.) YEAR BOOK in Japan, ETRTO (The European Tyre and Rim Technical Organisation) STANDARD MANUAL in Europe, TRA (THE TIRE and RIM ASSOCIATION INC.) YEARBOOK in U.S., or the like, as an industrial specification effective for a region in which tires are manufactured and used, and is filled with air at air pressure specified depending on a tire size in the specification of JATMA or the like.

Effects of the Invention

In accordance with the present invention, since the groove wall of a groove end located in the vicinity of the end section in the width direction of a groove formed on the surface of the tread section of a tire has a chamfered shape, the curvature radius of the corner of the groove end can be increased while inhibiting a groove volume from increasing and a crack starting from the corner can be therefore inhibited from being generated.

MODE FOR CARRYING OUT THE INVENTION

Embodiments of the pneumatic tire for a motorcycle of the present invention are explained in detail below with reference to the drawings.

Figure 1:
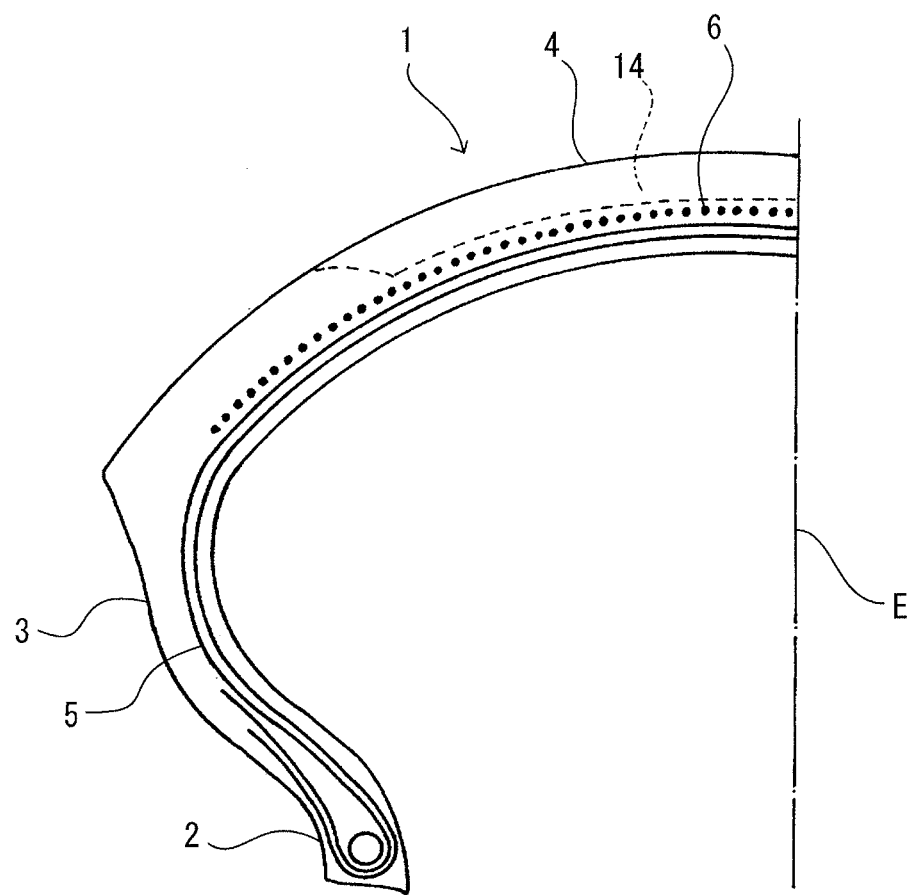
FIG. 1 is a schematic cross-sectional view of one embodiment of a pneumatic tire for a motorcycle of the present invention.

In one embodiment of the pneumatic tire for a motorcycle of the present invention, a tire 1 includes a pair of bead sections 2, a pair of side wall sections 3 coupled with the bead sections 2, and a tread section 4 coupled between both side wall sections 3 in FIG. 1 represented by the schematic view of a cross section along the rotation axis of the tire and a portion of division into two on the equatorial plane E of the tire. Further, in order to reinforce the bead sections 2, the side wall sections 3, and the tread section 4 on the internal side of the tire 1, the tire includes: a carcass 5 including at least a one-layered, two-layered carcass plie in the example illustrated in the drawing; and a belt layer 6 constituted by a so-called spiral belt prepared by winding a rubber-coated cord in spiral form in the circumferential direction of the tire 1 in the external side of the carcass 5 in the radial direction of the tire. Further, a groove 14 is formed on the surface of the tread section 4.

Figure 2:
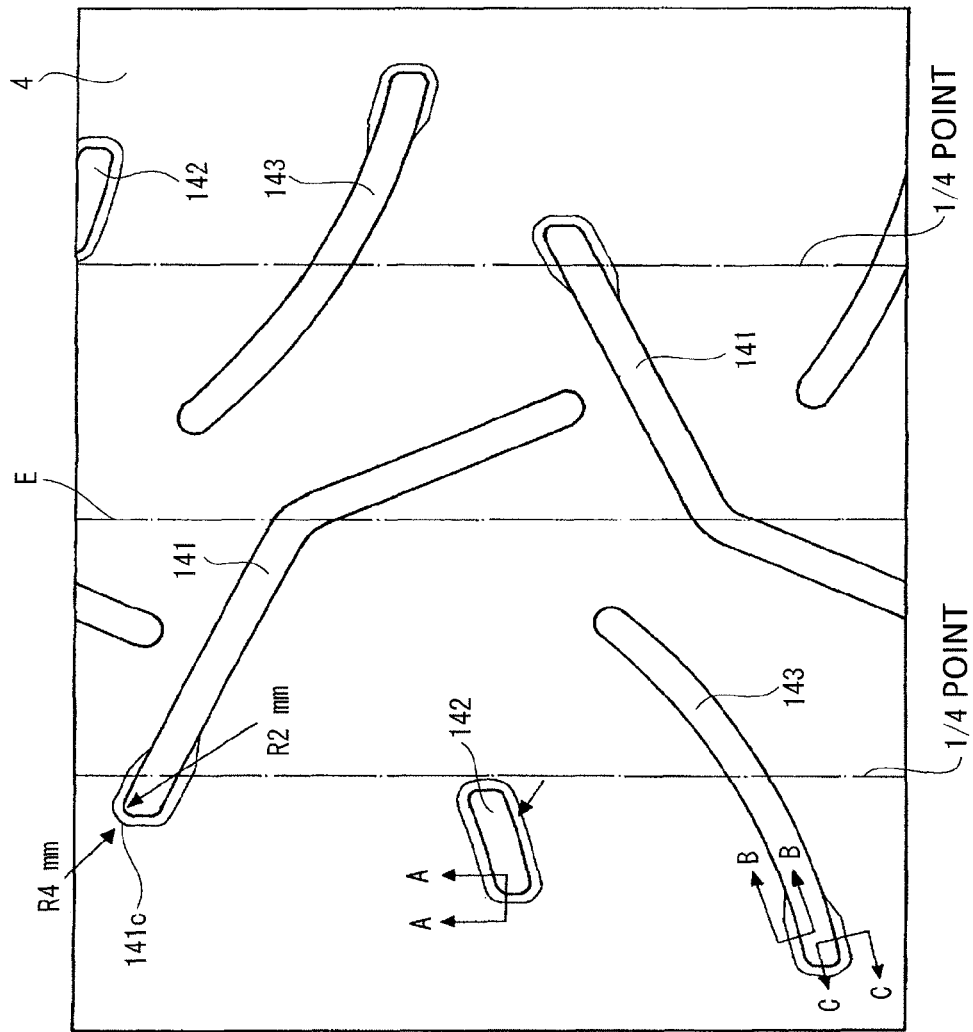
FIG. 2 is a partial development view of the wheel tread of a tread section of one embodiment of a pneumatic tire for a motorcycle of the present invention.

As the partial development view of the tread section 4 of the tire 1 of FIG. 1, represented in FIG. 2, plural grooves 141, 142, and 143 are included in the tread section 4 in the tire 1 according to the present embodiment. The groove 141 is a groove that crosses a tire equator, wherein an angle which the groove forms with the tire equator varies when the groove passes across the tire equator; and one groove end extends from a central position between tire equator and a tread end, i.e., the ¼ point of a tire periphery to the tread end. The groove 142 is located between the ¼ point of the tire periphery and the tread end. In the groove 143, one groove end is located between the tire equator and the ¼ point of the tire periphery and the other groove end is located between the ¼ point of the tire periphery and the tread end.

All the groove 141, groove 142 and groove 143 are, in a sense, closed grooves in which the groove end closer to the tread end is not opened toward the tread end. The rigidity of the wheel tread land section of the tread section 4 may be reduced if the groove end is opened. Accordingly, the groove end is not opened toward the tread end in order to avoid the reduction in rigidity.

Figure 3:
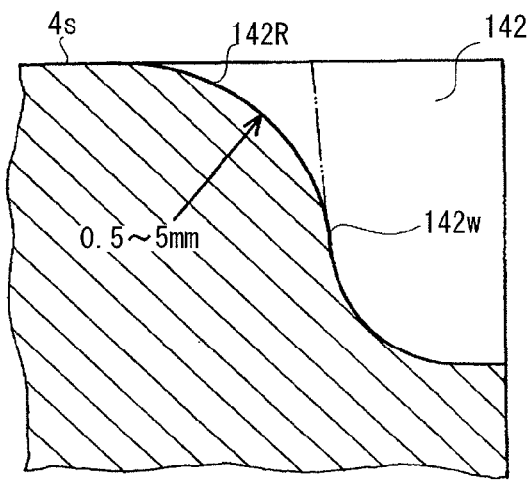
FIG. 3 is a partial cross-sectional view of one embodiment of a pneumatic tire for a motorcycle of the present invention.

As mentioned above, in all the groove 141, groove 142 and groove 143, at least one groove end is located between the ¼ point of the tire periphery and the tread end. Moreover, groove walls that form the groove ends of these grooves have chamfered shapes. An example of such chamfered shapes of the groove ends is illustrated in FIG. 3 as a cross-sectional view taken along the line A-A in the vicinity of the groove end of the groove 142 of FIG. 2. In the example illustrated in FIG. 3, a portion between the groove wall 142w of the groove 142 and a tread surface 4s has an R-chamfered shape, i.e., a shape in which the groove wall 142w is smoothly connected to the tread surface 4s through a curved surface 142R. Such an R-chamfered shape can be formed by, for example, making the end section of a projection for forming a groove formed on a tire molding die used in vulcanization molding in the step of manufacturing a tire have a curved shape capable of transferring the above-described curved surface 142R.

FIG. 3 represents the cross-sectional view taken along the line A-A in the vicinity of the groove end of the groove 142, while there are also chamfered shapes similar to that of FIG. 3 in cross sections taken along the lines B-B and C-C in the vicinity of the groove end of the groove 143 illustrated in FIG. 2. The groove end located between the ¼ point of the tire periphery and the tread end in the groove 141 of FIG. 2 also has a chamfered shape similar to that of FIG. 3.

In general, the corner of the groove end of a groove on the surface of the tread section of a pneumatic tire for a motorcycle has a curve having a certain curvature radius when being observed from a wheel tread. The curvature radius of the corner of the groove end in the tire in the related art is, for example, around 2 mm. When force is applied to a portion between a ¼ point and an end in the tread periphery of the tire to be deformed, it is the above-described corner of the groove end located in the portion that is easy to become the starting point of a crack. In the tire of the present embodiment, the groove wall that forms the groove end of the tread section has the chamfered shape and the curvature radius of the corner of the groove end can be thus made to be greater than that in the related art. The curvature radius of the corner of the groove end of the groove in the case of having the chamfered shape is, for example, around 4 mm as represented in the corner 141c of the groove end of the groove 141 of FIG. 2. This curvature radius is around 2 times greater than the curvature radius of the corner of the groove end in the tire in the related art. Accordingly, the concentration of stress on the corner during deforming the tread section can be moderated and the generation of a crack starting from the corner can be thus inhibited in comparison with the tire in the related art.

The curvature radius R of the curved surface 142R in the portion having the R-chamfered shape of the present embodiment illustrated in FIG. 3 preferably ranges from 0.5 to 5 mm. The curvature radius R of less than 0.5 mm results in the small effect of inhibiting a crack in the groove end section, while the curvature radius R of more than 5 mm may result in excessive increase in groove volume to adversely affect abrasion resistance. More preferably, it ranges from 1 to 3 mm.

In consideration of the inhibition of the generation of a crack, which is an object of the present invention, an example in which all the groove ends located between the ¼ point of the tire periphery and the tread end have chamfered shapes in the grooves 141, 142 and 143 formed in the tread as illustrated in FIG. 2 is preferred.

Figure 4:
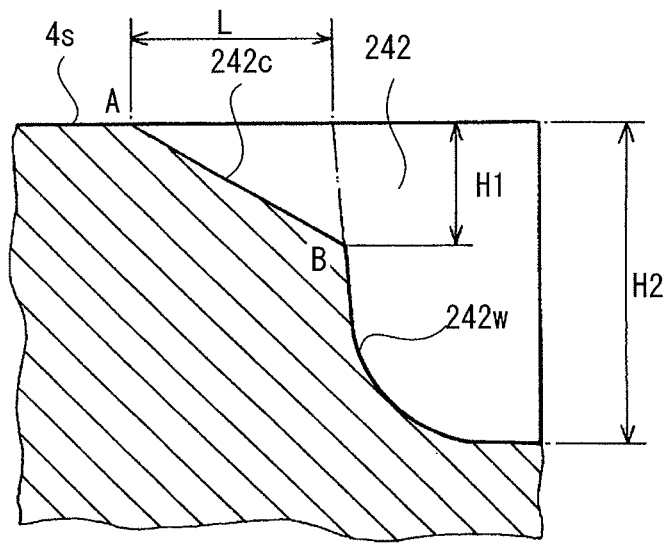
FIG. 4 is a partial cross-sectional view of another embodiment of a pneumatic tire for a motorcycle of the present invention.

In FIG. 4, a tire of another embodiment of the present invention is illustrated in a cross-sectional view of the vicinity of the groove end of a groove, as in FIG. 3. A groove 242 of FIG. 4 is a groove of which both groove ends are located between the ¼ point of a tire periphery and a tread end, as in the case of the groove 142 of FIG. 3. A groove wall that forms the groove end of the groove 242 has a C-chamfered shape between a tread surface 4s and the groove wall 242w of the groove 242, i.e., a shape in which the tread surface 4s is connected to the groove wall 242w through a planar surface 242C. The tire of the embodiment illustrated in FIG. 4 and the tire of the embodiment illustrated in FIG. 3 above have the same constitution except that the tires differ according to whether the chamfered shape is a C-chamfered or R-chamfered shape.

In the tire of the present embodiment illustrated in FIG. 4, since the groove wall that forms the groove end located between the ¼ point of the tire periphery and the tread end has a C-chamfered shape, there is an effect similar to that of the embodiment illustrated in FIG. 3, i.e., an effect in which the concentration of stress on the corner of the groove during deforming the tread section can be moderated and the generation of a crack starting from the corner of the groove can be thus inhibited in comparison with the tire in the related art.

Figure 5:
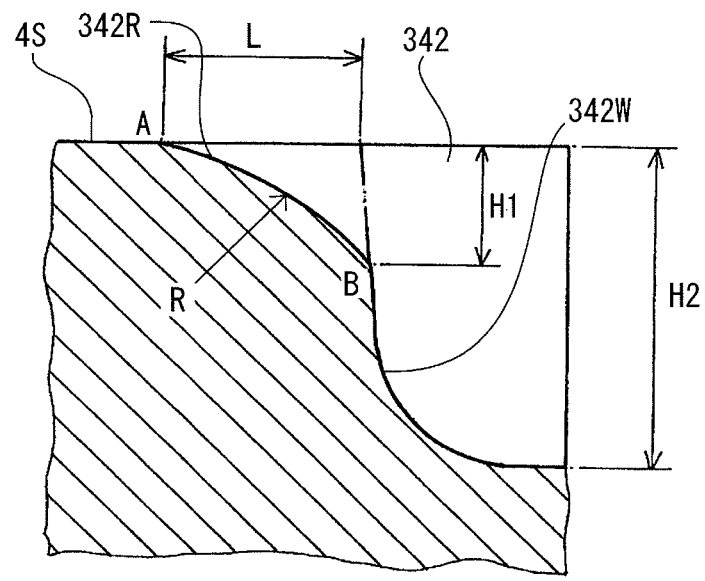
FIG. 5 is a partial cross-sectional view of another embodiment of a pneumatic tire for a motorcycle of the present invention.

In the embodiment illustrated in FIG. 4, the chamfered shape of the groove wall is the planar surface 242C, but the tire of the present invention can also have the constitution of a curved surface instead of the planar surface. In FIG. 5, a tire of another embodiment of the present invention including this constitution is illustrated in a cross-sectional view of the vicinity of the groove end of a groove, as in FIG. 3 and FIG. 4. A groove 342 of FIG. 5 is a groove of which both groove ends are located between the ¼ point of a tire periphery and a tread end, as in the case of the groove 142 of FIG. 3. A groove wall that forms the groove end of the groove 342 has a shape in which the tread surface 4s of the groove 342 is connected to the groove wall 342w through a curved surface 342R. The difference between the curved surface 342R of the chamfered shape of the present embodiment illustrated in FIG. 5 and the curved surface 142R of the chamfered shape of the embodiment above illustrated in FIG. 3 is in that the curved surface 142R illustrated in FIG. 3 is smoothly connected to the tread surface 4S and the groove wall 142W whereas the curved surface 342R of the present embodiment illustrated in FIG. 5 is unsmoothly connected to the tread surface 4S and the groove wall 342W through connection sections 342A and 342B, respectively. The same constitution is made except the difference. Although the example in which the curved surface 342R is connected to the tread surface 4S and the groove wall 342W through the connection sections 342A and 342B is illustrated in FIG. 5, without limitation to the illustrated example, an example in which the curved surface 342R is connected to the tread surface 4S through the connection section 342A and is smoothly connected to the groove wall 142W or an example in which the curved surface 342R is smoothly connected to the tread surface 4S and is connected to the groove wall 142W through 342B is also possible.

In the tire of the present embodiment illustrated in FIG. 5, since the groove wall that forms the groove end located between the ¼ point of the tire periphery and the tread end has a curved chamfered shape, there is an effect similar to that of the embodiment illustrated in FIG. 3, i.e., an effect in which the concentration of stress on the corner of the groove during deforming the tread section can be moderated and the generation of a crack starting from the corner of the groove can be thus inhibited in comparison with the tire in the related art.

The C-chamfered or R-chamfered shape of the groove walls illustrated in FIG. 4 and FIG. 5 can be formed by a molding die during vulcanization molding in the step of manufacturing a tire, as in the embodiment mentioned above.

In the embodiment illustrated in FIG. 4 and the embodiment illustrated in FIG. 5, assuming that the length L of the tread surface of a chamfer is a length from a position A, at which the planar or curved surface of the chamfered shape is connected to the tread surface 4s, to a position at which the groove wall in a case in which chamfering is not performed virtually is brought into contact with the tread surface, the length L of the tread surface of the chamfer is preferably 1 mm or more and 5 mm or less. The length of less than 1 mm results in the small effect of inhibiting a crack, while the length of more than 5 mm may result in excessive increase in groove volume to adversely affect abrasion resistance.

In the embodiment illustrated in FIG. 4 and the embodiment illustrated in FIG. 5, assuming that a depth H1 from the tread surface of the chamfer is a distance from the tread surface to a position B at which the planar or curved surface of the chamfered shape is connected to the groove wall in a groove depth direction, a ratio H1/H2 of the depth H1 from the tread surface of the chamfer to a groove depth H2 is preferably 0.2 or more and 0.5 or less. When H1/H2 is less than 0.2, the position B excessively becomes close to the tread surface and a crack is easily generated in the edge of the portion of the position B as in the case of no chamfering of the corner. In contrast, H1/H2 of more than 0.5 may result in excessive increase in groove volume to adversely affect abrasion resistance.

A preferred aspect of the groove common to the tires of the respective embodiments illustrated in FIG. 3 to FIG. 5 is explained below. The chamfered shape formed in the groove end of the groove is preferably formed in the range from the groove end to a length of 1% to 25% of the length of the tread periphery in the tread width direction. This is because it is impossible to sufficiently surround the corner of the groove end by R-chamfering or C-chamfering and, therefore, the effect of inhibiting a crack suppressive is not sufficiently obtained when the length is less than 1% while a region from the ¼ point to the center of the tread, in which a crack generated on the surface of the groove end is not generated, is made to have a chamfered shape and it is impossible to further expect the effect of improving the inhibition of a crack when the length is more than 25%. Preferably, only the external side from the ¼ in the tread width direction is chamfered.

The angle which the direction of the extension of the groove on the tread surface forms with the tread width direction, i.e., the groove swing angle of the groove preferably ranges from 0° to 85°. The range of more than 85° and 90° or less means that the groove is a groove substantially in a circumferential direction. In the tire of the present invention, the belt has a mono-spiral belt structure. The mono-spiral belt structure is a belt structure in which it is difficult to inhibit elongation in the tread width direction, and, therefore, when the groove swing angle of the groove is in the range of more than 85° and 90° or less, large distortion in the width direction is generated on the bottom of the groove to cause significantly poor cracking resistance from the bottom of the groove.

The depth of the groove, i.e., a distance in a straight line from the tread surface to the bottom of the groove is preferably 1 mm or more and 9 mm or less. This is because it is impossible to sufficiently secure grip performance during wetting when the groove depth is less than 1 mm while the thickness of a tread gauge in a portion in contact with the ground during cornering is excessively increased to cause significantly poor high-speed durability during cornering when the groove depth is more than 9 mm.

The width of the groove, i.e., the groove width in the direction orthogonal to the direction of the extension of the groove on the tread surface is preferably a length of 1% to 10% of the length of the tread periphery. When the groove width is less than 1% of the length of the tread periphery, it is difficult to sufficiently form a curved surface shape on the bottom of the groove and cracking performance on the bottom of the groove is significantly deteriorated. This is because, when the groove width is more than 10% of the length of the tread periphery, the groove width is excessively increased to excessively increase a percentage of the area of the groove in the surface of the tread and abrasion resistance in the region from the ¼ point to the tread end is therefore deteriorated.

In the present invention, as long as the groove of the tread section satisfies the requirements of the present invention, a tire structure and tire materials except the requirements are not particularly limited, but a tire structure and tire materials which are preferable are mentioned below.

As a cord for reinforcing a spiral belt constituting a belt layer, a steel cord can be used, and, in addition, an organic fiber such as aromatic polyamide (aramid, e.g., trade name: KEVLAR manufactured by DuPont), polyethylene naphthalate (PEN), polyethylene terephthalate (PET), rayon, ZYLON (registered trademark) (polyparaphenylene benzobisoxazole (PBO) fiber) or aliphatic polyamide (nylon), and, further, a material such as a glass fiber or a carbon fiber can be appropriately selected and used. In fact, a steel cord capable of enhancing rigidity and stabilizing movement of a wheel tread is preferably used as a reinforcing cord in order to secure straight line stability and high-speed durability at high levels.

Bead cores are buried in a pair of bead sections in the tire, respectively, and the carcass is folded and locked around the bead cores outward from the inside of the tire. Further, an inner liner is formed on the innermost layer of the tire in the radial direction.

The tire of the present invention is applicable to both front tire and rear tire of a motorcycle. In particular, the tire of the present invention is preferable as the rear tire.

EXAMPLES

Examples 1 to 16 and Comparative Example 1

A pneumatic tire for a motorcycle having a structure illustrated in FIG. 1 was produced to have a tire size of 160/60ZR17M/C. A carcass was two-layered, in which nylon was used for a reinforcing cord, and was placed to be at 0° with respect to a tire width direction. Further, a mono-spiral belt prepared by winding a rubber-coated steel cord in spiral form along the circumferential direction of the tire, i.e., a direction at 90° with respect to a tire width direction was used in a belt layer.

A tread section had a tread pattern illustrated in FIG. 2. More specifically, the groove of the tread section included a groove 141, a groove 142, and a groove 143 having a groove end between a ¼ point in the tread periphery of the tire and a width end. The angle which the wall surface of the groove end of each groove formed with a line perpendicular to a tread surface in the vicinity of a portion brought into contact with a groove bottom was 0°, i.e., the wall surface included a portion perpendicular to the tread surface and a portion of an R-chamfered shape with a curved shape that smoothly connected the perpendicular portion to the tread surface.

Tires with variously varied curvature radii of the portion of the R-chamfered shape were prepared as Examples 1 to 16, respectively. Further, an example having no portion of an R-chamfered shape on the wall surface of a groove end, i.e., a comparative example in which the curvature radius of a portion of an R-chamfered shape was 0 mm was also prepared for comparison.

The tires of the examples and the comparative example were mounted on rims of MT4.50-17M/C and were subjected to a drum test to determine travel distances until the corners of groove ends were cracked and to indicate indices based on the comparative example 1. A higher numerical value thereof means superior cracking resistance. The conditions of the drum test were as follows.

Internal pressure: 290 kPa
Load: 3.19 kN
Speed: 50 km/h

Further, a grip characteristic was evaluated as an index based on 100 of the comparative example by an actual vehicle subjective test. Furthermore, an actual vehicle road test was conducted in a circuit track in a test course to evaluate abrasion resistance as an index based on 100 of the comparative example by the abrasion loss of a groove in a region in the vicinity of a ¼ point. The results are listed in Table 1 and Table 2. Since Example 8 is an example having a C-chamfered shape (linear shape in the cross-sectional view of FIG. 4) corresponding to FIG. 4, no curvature radius of Example 8 is listed in Table 1.

TABLE 1

|  | Comparative Example | Example 1 | Example 2 | Example 3 | Example 4 | Example 5 | Example 6 | Example 7 | Example 8 |
| --- | --- | --- | --- | --- | --- | --- | --- | --- | --- |
| Curvature radius of curved surface | 0 mm | 0.5 mm | 1 mm | 2 mm | 3 mm | 5 mm | 6 mm | 7 mm | — |
| Length L of tread surface of chamfer | 1 mm | 1 mm | 1 mm | 1 mm | 1 mm | 1 mm | 1 mm | 1 mm | 1 mm |
| H1/H2 | 0.3 | 0.3 | 0.3 | 0.3 | 0.3 | 0.3 | 0.3 | 0.3 | 0.3 |
| Cracking resistance | 100 | 165 | 185 | 225 | 245 | 270 | 276 | 281 | 225 |
| Grip characteristic | 100 | 100 | 100 | 100 | 100 | 100 | 98 | 96 | 100 |
| Abrasion resistance | 100 | 100 | 100 | 100 | 99 | 97 | 95 | 90 | 100 |

TABLE 2

|  | Example 9 | Example 10 | Example 11 | Example 12 | Example 13 | Example 14 | Example 15 | Example 16 |
| --- | --- | --- | --- | --- | --- | --- | --- | --- |
| Curvature radius of curved surface | 1 mm | 1 mm | 1 mm | 1 mm | 1 mm | 1 mm | 1 mm | 1 mm |
| Length L of tread surface of chamfer | 3 mm | 5 mm | 7 mm | 0.5 mm | 1 mm | 1 mm | 1 mm | 1 mm |
| H1/H2 | 0.3 | 0.3 | 0.3 | 0.3 | 0.1 | 0.2 | 0.5 | 0.7 |
| Cracking resistance | 190 | 190 | 190 | 175 | 155 | 180 | 185 | 185 |
| Grip characteristic | 100 | 100 | 100 | 100 | 100 | 100 | 100 | 100 |
| Abrasion resistance | 100 | 100 | 98 | 100 | 100 | 100 | 100 | 99 |

Table 1 and Table 2 reveal that the tire of each example according to the present invention has an excellent grip characteristic, in which a crack can be inhibited from being generated. When the curvature radius of a curved surface exceeds 5 mm as in Example 6 or 7, the effect of cracking resistance exhibits a saturation tendency and a tendency to deteriorate abrasion resistance and grip performance is exhibited.

REFERENCE SIGNS LIST

1 Tire
2 Bead section
3 Side wall section
4 Tread section

5 Carcass
6 Belt
14 Groove
141, 142, 143, 242, 342 Groove

The invention claimed is:

1. A pneumatic motorcycle tire comprising:
   at least a one-layered spiral belt comprising a rubber-coated cord wound in spiral form in the circumferential direction of the tire on the perimeter side of a carcass in a toroidal shape between a pair of bead sections;
   a tread having a curved profile in a cross-section taken along the length of the tread; and
   a groove in said tread of which a groove end is located between a central position, between a tire equator and a tread end in the width direction of a tread, and the tread end, on a surface of a tread section in an external side in the radial direction of the tire from the spiral belt,
   wherein, in the groove, a groove wall which forms the groove end located between the central position, between the tire equator and the tread end in the width direction of the tread, and the tread end, has a chamfered shape in a cross section in the width direction, the groove end including a corner of the groove, and
   wherein a depth H1 is a distance from the tread surface to a position B at which a planar surface of the chamfered shape is connected to the groove wall in a groove depth direction, and
   wherein a groove depth H2 is deeper than the depth H1,
   wherein, in the groove, the groove wall located between the central position, between the tire equator and the tread end in the width direction of the tread, and the tire equator, has no chamfered shape, and
   wherein the groove wall of the groove and an end wall form the corner of the groove end, the groove wall has a chamfered shaped in a cross-section in the width direction of the groove, and the end wall has a chamfered shape in a cross-section in the length direction of the groove.

2. The pneumatic motorcycle tire according to claim 1, wherein the chamfered shape is formed to have a length ranging from 1% to 25% of a tread periphery length in a tread width direction from the groove end of the groove.

3. The pneumatic motorcycle tire according to claim 1, wherein a corner of the groove, where the groove wall having the chamfered shape is disposed, has a predetermined curvature when viewed facing the tread.

4. The pneumatic motorcycle tire according to claim 1, wherein a groove swing angle, which is an angle between an extension direction of the groove and the tread width direction, is from 0 to 85 degrees.

5. The pneumatic motorcycle tire according to claim 1, wherein the depth of the groove is 1 mm or more and 9 mm or less.

6. The pneumatic motorcycle tire according to claim 1, wherein the width of the groove, which is a width measured in a direction orthogonal to an extension direction of the groove, is equal to 1% to 10% of the length of a periphery of the tread.

7. The pneumatic motorcycle tire according to claim 1, wherein a length L of the chamfered groove wall, defined as a distance from a position at which the chamfered groove wall connects to a surface of the tread to a position where the groove wall would be located on the tread surface if the groove wall was not chamfered, is 1 mm or more and 5 mm or less.

8. The pneumatic motorcycle tire according to claim 1, wherein a ratio H1/H2 of the depth H1 to a groove depth H2 is 0.2 or more and 0.5 or less.

9. A pneumatic motorcycle tire comprising:
   at least a one-layered spiral belt comprising a rubber-coated cord wound in spiral form in the circumferential direction of the tire on the perimeter side of a carcass in a toroidal shape between a pair of bead sections;
   a tread having a curved profile in a cross-section taken along the length of the tread; and
   a groove in said tread of which a groove end is located between a central position, between a tire equator and a tread end in the width direction of a tread, and the tread end, on a surface of a tread section in an external side in the radial direction of the tire from the spiral belt, the groove being inclined with respect to the tire equator,
   wherein, in the groove, a groove wall which forms the groove end located between the central position, between the tire equator and the tread end in the width direction of the tread, and the tread end, has a chamfered shape in a cross section in the width direction, and
   wherein the groove has a finite length, the groove end including a corner of the groove, and
   wherein a depth H1 is a distance from the tread surface to a position B at which a planar surface of the chamfered shape is connected to the groove wall in a groove depth direction, and
   wherein a groove depth H2 is deeper than the depth H1,
   wherein, in the groove, the groove wall located between the central position, between the tire equator and the tread end in the width direction of the tread, and the tire equator, has no chamfered shape,
   wherein the groove wall of the groove and an end wall form the corner of the groove end, the groove wall has a chamfered shaped in a cross-section in the width direction of the groove, and the end wall has a chamfered shape in a cross-section in the length direction of the groove.

10. The pneumatic motorcycle tire according to claim 9, wherein a ratio H1/H2 of the depth H1 to a groove depth H2 is 0.2 or more and 0.5 or less.

* * * * *